(12) United States Patent
Kraus

(10) Patent No.: US 7,647,881 B2
(45) Date of Patent: Jan. 19, 2010

(54) DIMENSIONAL ENHANCEMENT LENS

(75) Inventor: Karen M. Kraus, Farmington Hills, MI (US)

(73) Assignee: Visteon Global Technologies, Van Buren Township, MI (US)

( * ) Notice: Subject to any disclaimer, the term of this patent is extended or adjusted under 35 U.S.C. 154(b) by 251 days.

(21) Appl. No.: 11/746,309

(22) Filed: May 9, 2007

(65) Prior Publication Data

US 2008/0278803 A1 Nov. 13, 2008

(51) Int. Cl.
G01D 11/26 (2006.01)
G01D 13/00 (2006.01)
B60K 35/00 (2006.01)

(52) U.S. Cl. .................. 116/304; 116/DIG. 5; 353/40; 359/798; 359/802; 359/742; 362/26; 362/489

(58) Field of Classification Search ................ 116/28.1, 116/49, 62.1–62.4, 284, 286, 302, 304, 305, 116/334, 335, DIG. 5, DIG. 20, DIG. 35, 116/DIG. 36; 362/26, 27, 29, 489, 617, 620; 359/798, 802, 809, 810, 742, 811
See application file for complete search history.

(56) References Cited

U.S. PATENT DOCUMENTS

| | | | | |
|---|---|---|---|---|
| 1,726,314 | A | * | 8/1929 | Rose .......................... 116/304 |
| 1,739,954 | A | | 12/1929 | DuPont |
| 2,907,869 | A | | 10/1959 | Hudson et al |
| 3,418,426 | A | | 12/1968 | Schlegel et al |
| 3,475,086 | A | | 10/1969 | Vetter |
| 3,761,703 | A | | 9/1973 | Mund et al. |
| 3,980,041 | A | * | 9/1976 | Evans ......................... 116/62.3 |
| 4,231,068 | A | | 10/1980 | Hunt |
| 4,253,737 | A | | 3/1981 | Thomsen et al. |
| 4,309,074 | A | | 1/1982 | Granieri, Jr. |

(Continued)

FOREIGN PATENT DOCUMENTS

DE  39 24 707  1/1991

(Continued)

OTHER PUBLICATIONS

"Applications of CPL mask technology for sub-65nm gate imaging", Litt, Lloyd C.; Conley, Will; Wu, Wei; Peters, Richie; Parker, Colite; Cobb, Jonathan; Kasprowicz, Bryan S.; van den Broeke, Doug; Park, J.C.; Karur-Shanmugam, Ramkumar, Optical Microlithography XVIII. Edited by Smith, Bruce W. Proceedings of the SPIE, vol. 5754, pp. 1459-1468 (2004). (SPIE Homepage). Publication date: May 2004.

(Continued)

*Primary Examiner*—Amy Cohen Johnson
(74) *Attorney, Agent, or Firm*—Brinks Hofer Gilson & Lione

(57) ABSTRACT

A lens for use with a display panel configured to emit light and display images is provided. The lens has a light-emitting surface and a plurality of enhancement portions. A first enhancement portion is configured to physically correspond to a first image displayed on the display screen. The first enhancement portion is further configured to collect at least a portion of the light emitted by the display screen and emit the light through the light-emitting surface of the lens. A second enhancement portion is configured to physically correspond to a second image displayed on the display screen.

20 Claims, 4 Drawing Sheets

U.S. PATENT DOCUMENTS

| | | | |
|---|---|---|---|
| 4,529,268 A | 7/1985 | Brown | |
| 4,562,481 A | 12/1985 | Trakas | |
| 4,577,928 A | 3/1986 | Brown | |
| 4,613,128 A | 9/1986 | Lasky | |
| 4,633,322 A | 12/1986 | Fourny | |
| 4,651,219 A | 3/1987 | Rickert | |
| 4,712,870 A | 12/1987 | Robinson et al. | |
| 4,731,558 A | 3/1988 | Haisma et al. | |
| 4,757,626 A | 7/1988 | Weinreich | |
| 4,788,597 A | 11/1988 | Gart et al. | |
| 4,926,331 A | 5/1990 | Windle et al. | |
| 4,929,865 A | 5/1990 | Blum | |
| 4,974,935 A | 12/1990 | Lee | |
| 5,013,135 A | 5/1991 | Yamamura | |
| 5,153,481 A | 10/1992 | Matsuda et al. | |
| 5,155,627 A | 10/1992 | Keehn et al. | |
| 5,229,754 A * | 7/1993 | Aoki et al. | 345/9 |
| 5,442,488 A * | 8/1995 | Pastorino | 359/802 |
| 5,748,288 A | 5/1998 | Nagano et al. | |
| 5,920,256 A * | 7/1999 | Toffolo et al. | 340/461 |
| 6,367,940 B1 | 4/2002 | Parker et al. | |
| 6,404,333 B1 | 6/2002 | Ayres et al. | |
| 6,532,117 B2 * | 3/2003 | Taylor | 359/803 |
| 6,571,726 B2 * | 6/2003 | Tsai et al. | 116/28.1 |
| 6,778,342 B1 | 8/2004 | Chang et al. | |
| 6,830,356 B2 * | 12/2004 | Larocque | 362/98 |
| 7,031,070 B2 | 4/2006 | Suzuki et al. | |
| 7,088,508 B2 | 8/2006 | Ebina et al. | |
| 7,313,962 B1 * | 1/2008 | O'Neil | 73/700 |
| 7,347,574 B2 * | 3/2008 | Kraus | 362/23 |
| 7,382,237 B2 * | 6/2008 | Stoschek et al. | 340/438 |
| 2002/0085366 A1 | 7/2002 | Angell et al. | |
| 2003/0227676 A1 | 12/2003 | Manico et al. | |
| 2004/0051944 A1 | 3/2004 | Stark | |
| 2004/0085746 A1 | 5/2004 | Chen | |
| 2004/0204204 A1 * | 10/2004 | Brilliant et al. | 455/575.1 |
| 2005/0122396 A1 | 6/2005 | Mizukami et al. | |

FOREIGN PATENT DOCUMENTS

| | | |
|---|---|---|
| DE | 198 16 018 | 10/1999 |
| DE | 199 03 201 | 8/2000 |
| DE | 102 39 828 | 3/2003 |
| DE | 101 53 100 | 5/2003 |
| DE | 10 2005 003 919 | 9/2005 |
| DE | 10 2006 026 355 | 12/2006 |

OTHER PUBLICATIONS

"Resolution-enhanced three-dimension/two-dimension convertible display based on integral imaging", Park, Jae-Hyeung (Optical Eng./Quant. Electron. Lab., School of Electrical Engineering, Seoul National University); Kim, Joohwan; Kim, Yunhee; Lee, Byoungho; Source: Optics Express, v. 13, n. 6, Mar. 2005, pp. 1875-1884; Publisher: Optical Society of America.

"Laser tweezer controlled solid immersion lens for high resolution imaging in microfluidic and biological samples", Birkbeck, Aaron L. (University of California, San Diego, MC 0408); Zlatanovic, Sanja; Ozkan, Mihrimah; Esener, Sadik C., Source: Proceedings of SPIE—The International Society for Optical Engineering, v. 5275, BioMEMS and Nanotechnology, 2004, pp. 76-84, Publisher: The International Society for Optical Engineering.

"ArF photoresist parameter optimization for mask error enhancement factor reduction", Lee, Chang Ho (Samsung Electronics Co.); Hye-Keun, O.H., Source: Japanese Journal of Applied Physics, Part 1: Regular Papers and Short Notes and Review Papers, v 44, n 10, Oct. 11, 2005, pp. 7404-7408, Publisher: Japan Society of Applied Physics.

"Applications of CPL (trademark) mask technology for sub-65nm gate imaging", Litt, Lloyd C. (Freescale Semiconductor, APRDL); Conley, Will; Wu, Wei; Peters, Richie; Parker, Colita; Cobb, Jonathan; Kasprowicz, Bryan S.; Van Broeke, Doug Den; Park, J.C.; Karur-Shanmugam, Ramkumar, Source: Proceedings of SPIE—The International Society for Optical Engineering, v. 5754, n Part 3, Optical Microlithography XVIII, 2005, pp. 1459-1468, Publisher: International Society for Optical Engineering.

"Limits of optical lithography", Maenhoudt, Mireille (IMEC); Verhaegen, Staf; Ronse, Kurt; Zandbergen, Peter; Muzio, Ed, Source: Proceedings of SPIE—The International Society for Optical Engineering, v 4000 (I), 2000. p. 373-387, Publisher: Society of Photo-Optical Instrumentation Engineers.

Webpage:—CT Readscope Industrial Corp., TV Magnifier/Protective Screen.

* cited by examiner

DIMENSIONAL ENHANCEMENT LENS

BACKGROUND OF THE INVENTION

As a result of an increase in the amount of information available to a driver today, digital large format displays are becoming more popular for use in motor vehicles to display driver information. Because digital displays may be reconfigurable, they are a desirable way to get an abundance of data to the driver, without being overwhelming, because they are capable of displaying only the data that is pertinent for any specific moment.

One problem with digital displays is that they have a flat surface, offering no three-dimensional elements for visual interest or emphasis of information. Designers are reluctant to work with a flat rectangle, especially for an entire cluster of driver information. Furthermore, although a large flat display is expensive, it does not impart the look of a luxury product due to lack of dimensional details.

BRIEF SUMMARY OF THE INVENTION

The present invention provides a dimensional enhancement lens for use with a digital display screen. The dimensional enhancement lens provides dimensional details to a display screen to define or emphasize images displayed thereon, while simultaneously allowing the display screen to remain reconfigurable.

The lens is provided for use with a display panel that is configured to emit light and display images. The lens comprises a light-emitting surface and a plurality of enhancement portions. A first enhancement portion of the plurality of enhancement portions is configured to physically correspond to a first image displayed on the display screen. The first enhancement portion is further configured to collect at least a portion of the light emitted from the display screen and emit the light through the light-emitting surface. A second enhancement portion of the plurality of enhancement portions is configured to physically correspond to a second image displayed on the display screen.

DETAILED DESCRIPTION OF THE INVENTION

Figure 1:
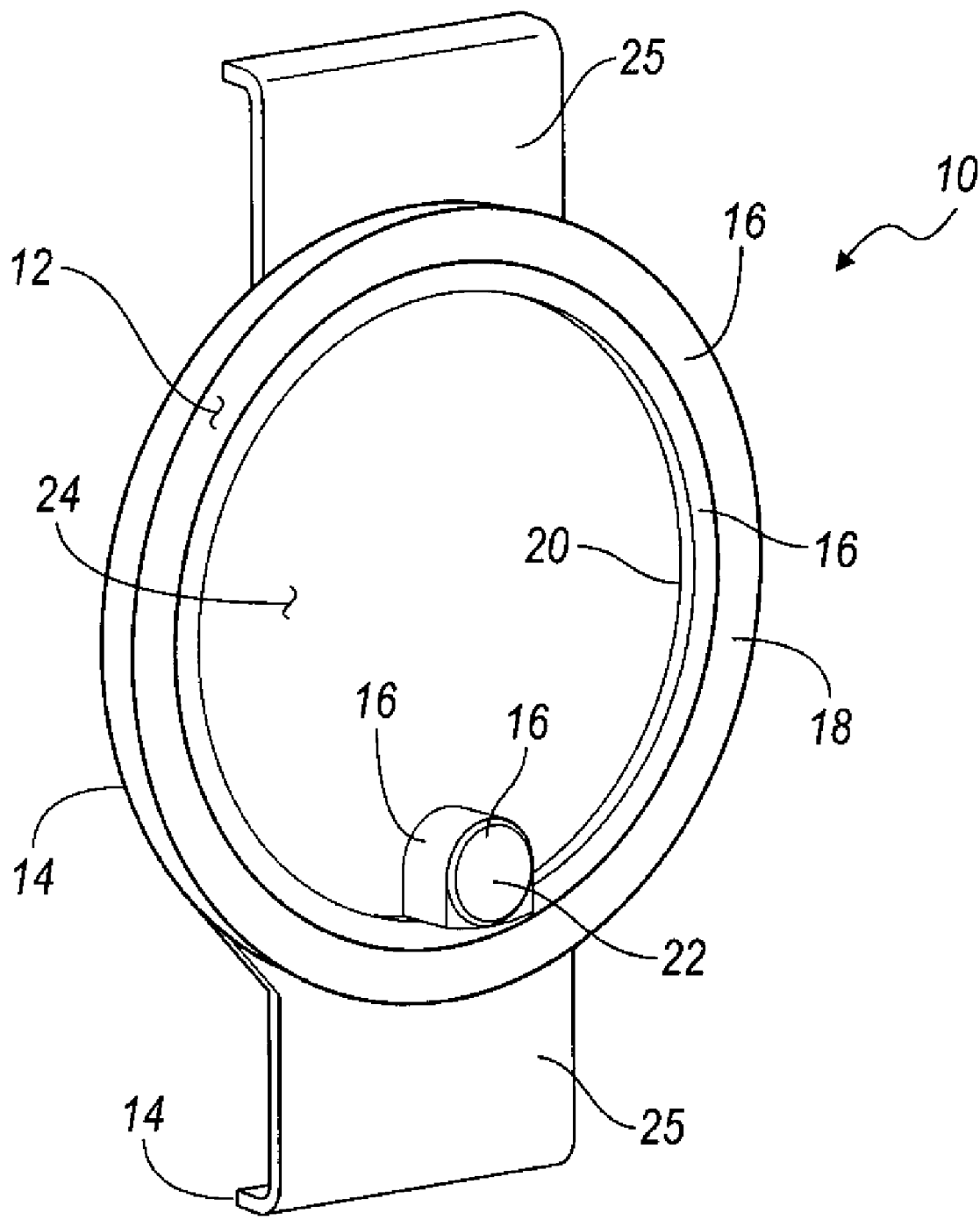
FIG. 1 is a perspective view of a first embodiment of a lens embodying the principles of the present invention.

Referring now to FIG. 1, a first embodiment of a dimensional enhancement lens embodying the principles of the present invention is illustrated therein and designated at 10. The lens 10 has a light-collecting surface 12 disposed opposite to a light-emitting surface 14. The lens 10 includes a plurality of enhancement portions 16. The enhancement portions 16 of this embodiment include an outer enhancement ring 18, an inner enhancement ring 20, a magnifying enhancer 22, and an opening 24. Additionally or in the alternative, the enhancement portions 16 may have a variety of other configurations without falling beyond the spirit and scope of the present invention. The enhancement portions 16 are described in further detail below. The lens 10 may also include legs 25 for connecting the lens 10 to a bezel or for transmission of light.

Figure 2:
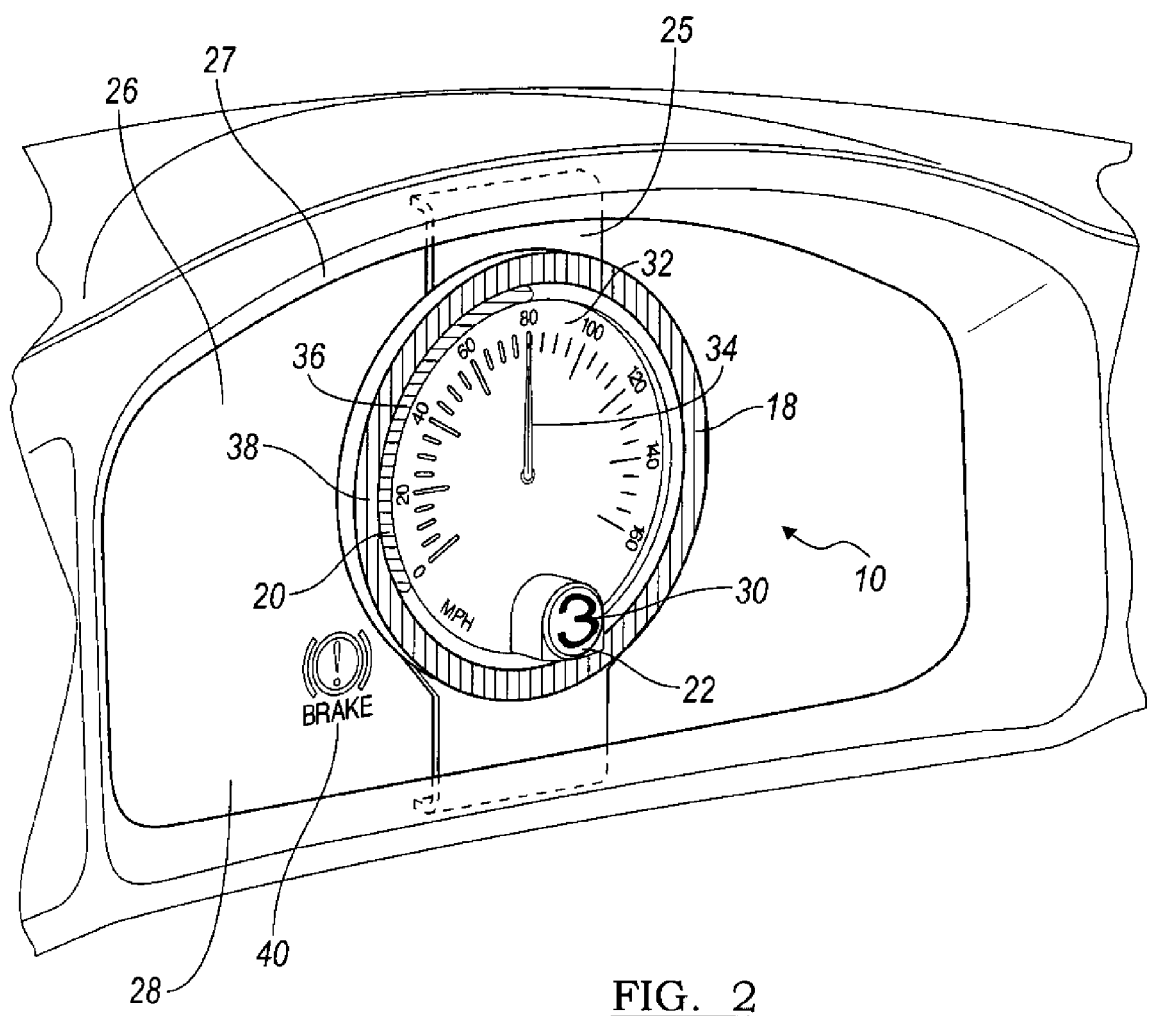
FIG. 2 is a perspective view of the lens of FIG. 1, used with a display panel.

With reference to FIG. 2, the lens 10 overlays a display panel 26. The legs 25 of the lens 10 are tucked into the bezel 27 of the display panel 26. In the alternative, the lens 10 could be formed as a part of the display panel 26.

The display panel 26 has a display screen 28 configured to emit light and display a plurality of images. The display screen 28 is a flat or nearly flat screen, for example, a liquid crystal display (LCD) screen, a thin film transistor (TFT) LCD screen, a screen utilizing a digital light processing (DLP) projector, a liquid crystal on silicon (LCOS) screen, a plasma display panel (PDP), a cathode ray tube, or any other suitable display screen. In FIG. 2, the display screen 28 is illustrated displaying a gear indicator 30, a speedometer 32 having a pointer 34, a pointer chaser 36, a warning ring 38, and a brake warning light 40. Additionally or in the alternative, it is contemplated that the display screen 28 could display a variety of other images without failing beyond the spirit and scope of the present invention.

The enhancement portions 16 are each configured to physically correspond to certain images displayed on the display screen 28. For example, the lens 10 may have portions defining an opening 24, or window, through which a portion of the images on the display screen 28 may be viewed. The lens 10 of FIG. 2 is positioned so that the speedometer 30 is displayed within the opening 24 of the lens 10. The enhancement rings 18, 20 of the lens 10 separate the speedometer 30 from the brake warning light 40 and other images that may be displayed on the outside of the opening 24 of the lens 10. This provides a contoured visual separation between the speedometer 32 and the brake warning light 40. Because some display screens 28 have "touch-screen" functionality, as is known by a person having ordinary skill in the art, the opening 24 may also allow the viewer access to touch the display screen 28.

In the embodiment of FIG. 2, the warning ring 38 and pointer chaser 36, which are displayed on the display screen 28, are configured to correspond to the outer enhancement ring 18 and the inner enhancement ring 20, respectively. Thus, the outer enhancement ring 18 and the inner enhancement ring 20 collect light from the warning ring 38 and the pointer chaser 36 and emit the light through the light-emitting surface 12 of the lens 10. In this embodiment, the enhancement rings 18, 20 comprise portions of a Fresnel lens or echelon lens; however, it is contemplated that the enhancement rings 18, 20 could have other configurations without falling beyond the spirit and scope of the present invention.

Likewise, the gear indicator 30, which is displayed on the display screen 28, is configured to correspond to, and be located behind, the magnifying enhancer 22. In this embodiment, the magnifying enhancer 22 is a magnifying lens that magnifies the gear indicator 30.

The display screen 28 may be a reconfigurable display screen 28. In other words, the display screen 28 may be configured to display a first set of images that correspond to the enhancement portions 16 of the lens 10, and then to display a second set of images that correspond to the enhancement portions 16 of the lens 10. For example, with reference to FIG. 2, a first set of images comprising the speedometer 32, the gear indicator 30, the warning ring 38, and the pointer chaser 36 correspond to the enhancement portions 16, including the opening 24, the magnifying enhancer 22, and the enhancement rings 18, 20.

Figure 3:
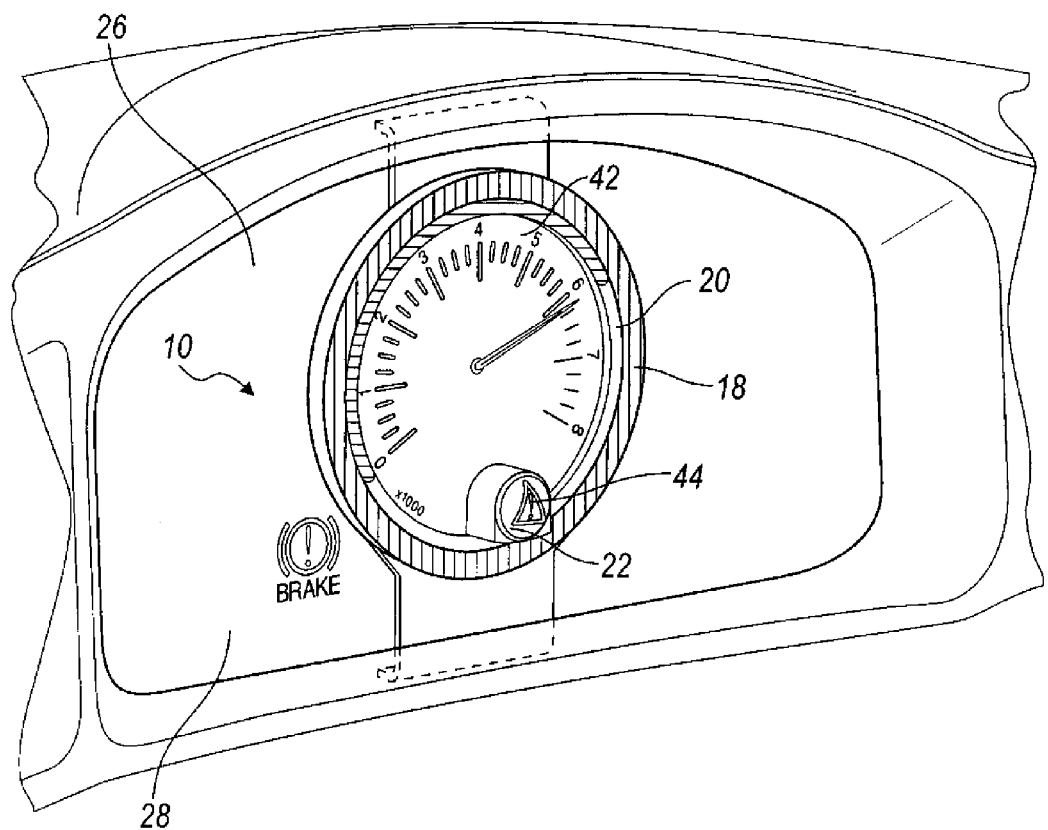
FIG. 3 is a perspective view of the lens and display panel of FIG. 2, with the display panel being reconfigured.

Now with reference to FIG. 3, a second set of images is displayed by the display screen 28 that also corresponds to the enhancement portions 16 of the lens 10. The second set of images comprises a tachometer 42 and a warning light 44. The tachometer 42 is located within the opening 24 of the lens 10. The warning light 44 is located behind the magnifying enhancer 22, such that the magnifying enhancer 22 provides a magnified view of the warning light 44. The other enhancement features 16 could also correspond to members of the second set of images. For example, the outer enhancement ring 20 could be used to emit light from a warning ring 38, as in the configuration of FIG. 2, or it may be used to emit light originating from another image, such as a continuously lit ring. As a person having ordinary skill in the art would understand, the display screen 28 could be reconfigurable to display a variety of other images, such as other driver information gauges.

Figure 4:
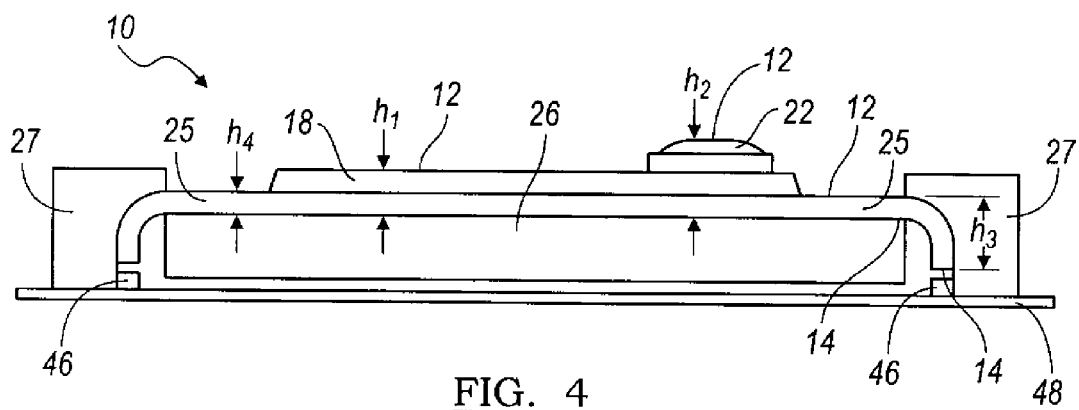
FIG. 4 is a cross-sectional view of the lens and display panel of FIGS. 1-2.

At least one enhancement portion 16 collects at least a portion of the light emitted from the display screen 28 and emits that light through the light-emitting surface 12 of the lens 10. Additionally, with reference to FIG. 4, the enhancement portions 16 of the lens 10 may collect light from an external light source, such as one or more light-emitting diodes (LEDs) 46. The LEDs 46 could be electrically connected to a printed wiring board 48 located behind the display panel 26. Light originating from an external light source, such as the LEDs 48, could enhance the images displayed on the display screen 28 by giving them an appearance of having depth. In other words, an external LED 48 could provide a "floating element" appearance to the images displayed on the display screen 28. The external LED 48 could also provide other enhancing features, such as a change in color.

Furthermore, the lens 10 could provide a look of depth by virtue of the lens 10 having various heights. More specifically, heights $h_1$, $h_2$, $h_3$, and $h_4$ are defined between the light-collecting surface 14 and the light-emitting surface 12 of the lens 10. These heights $h_1$, $h_2$, $h_3$, and $h_4$ are of various dimensions, the use of which gives shape and depth to the images that are viewable through the lens 10. In other words, preferably, at least a portion of the heights $h_1$, $h_2$, $h_3$, and $h_4$ of the lens 10 are of different magnitudes.

The lens 10 is preferably at least partially transparent or translucent, in order to allow images displayed on the display screen 28 to be viewable through the lens 10. However, the lens 10 could have portions that are opaque, as will be described in further detail below.

Figure 5:
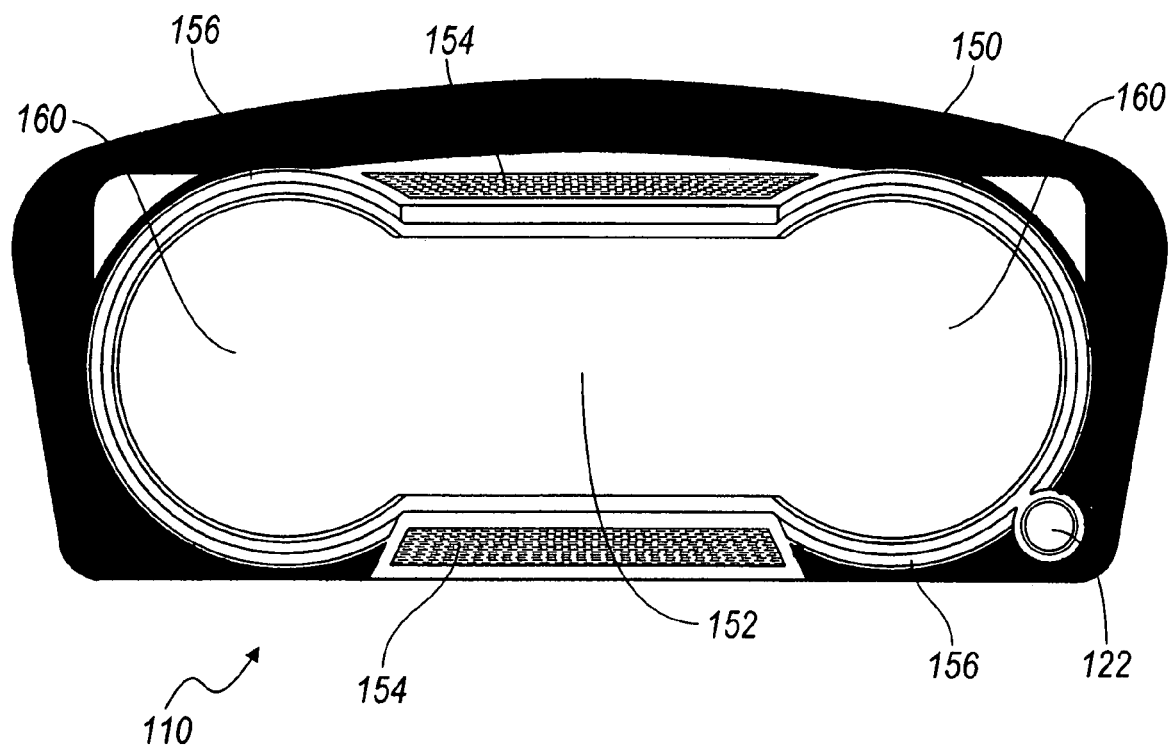
FIG. 5 is a perspective view of a second embodiment of a lens embodying the principles of the present invention.

With reference to FIG. 5, a second embodiment of a lens 110 embodying the principles of the present invention is illustrated. Like the lens 10 of FIGS. 1-4, the lens 110 of FIG. 5 is configured to be placed upon, and preferably attached to, a display screen. The lens 110 has various enhancement portions, including an opaque portion 150 surrounding a portion of the outer edge of the lens 110. The center portion 152 of the lens 110 is clear, allowing for images to be viewed therethrough. The lens 110 also includes translucent portions 154, which may be tinted gray, in order to enhance corresponding images displayed on the display screen.

Furthermore, the lens 110 includes a magnifying enhancer 122, which is similar to the magnifying enhancer 22 of FIGS. 1-4. The lens 110 also may include paint or metallization. For example, the lens 110 includes portions 156 that have been metallized for an added visual effect.

Like the enhancement portions 16 of the lens 10, the enhancement portions 150, 152, 154, 156, 122 of the lens 110 are configured to correspond to images displayed on a display screen. For example, circular gauges could appear on the display screen within the circular portions 160 of the lens 110, and the circular gauges would appear to have a metal border, due to the metallization 156.

The lenses 10, 110 add dimensional interest to the display screen 28, which is ordinarily flat. The lenses 10, 110 may also separate or define groups of information displayed on the display screen 28. The lenses 10, 110 illuminate and enhance images displayed on the display screen 28, while simultaneously allowing changes to the images to occur, because the changes are software driven. However, the appearance of the images may be controlled by the various enhancement features 16, which may include the sizes of the radii of the enhancement rings 18, 20, the heights $h_1$, $h_2$, $h_3$ of the lenses 10, 110, the angle of chamfers included on the lenses 10, 110, the Fresnel lens features, colors and patterns added to either the light-collecting surface 14 or the light-emitting surface 12, paint and/or metallization 156, magnifying enhancers 22, 122, distorters, functional or decorative graphics added to the lenses 10, 110, openings 24 or clear portions 152 within the lens 10, 110, and translucent portions 154.

The lenses 10, 110 could be created in a two step molding process involving molding a shot of clear material, and then overmolding the, clear material with an opaque material. Likewise, a third shot could be added to include translucent material. The first, second, and third shots could be molded in any order, without falling beyond the spirit and scope of the present invention. In the alternative, the lens 110 could be created through a different or additional process, such as cutting. Anti-reflective coating could also be added to the lens 110 so as to reduce reflection and enhance visibility of images displayed by the display screen.

The lenses 10, 110 are preferably formed of molded plastic. However, it is also contemplated that the lenses 10, 110 could be formed of glass or other material, without departing from the spirit and scope of the present invention.

As can be appreciated by one having ordinary skill in the art, the lenses 10, 110 are configured for use with a display panel 26 in a motor vehicle that displays driver information. However, it is contemplated that the lenses 10, 110 could also be used with other types of display panels without falling beyond the spirit and scope of the present invention.

As a person skilled in the art will readily appreciate, the above description is meant as an illustration of implementation of the principles this invention. This description is not intended to limit the scope or application of this invention in that the invention is susceptible to modification, variation, and change, without departing from the spirit of this invention, as defined in the following claims.

The invention claimed is:

1. A display assembly comprising:
   a display panel having a display screen configured to emit light and display a plurality of images;
   a lens overlying at least a portion of the display screen, at least a portion of the lens being transparent or translucent, the lens comprising:
   a light-emitting surface; and
   a plurality of enhancement elements, a first enhancement element of the plurality of enhancement elements being configured to physically correspond to a first image of the plurality of images displayed on the display screen, the first enhancement element being further configured to collect at least a portion of the light emitted by the display screen and emit the light through the light-emitting surface, and a second enhancement element of the plurality of enhancement elements being configured to physically correspond to a second image of the plurality of images displayed on the display screen, the first and second enhancement elements being distinct.

2. The display assembly of claim 1, the lens further comprising at least one opaque portion.

3. The display assembly of claim 1, the lens further comprising portions that include metallization.

4. The display assembly of claim 1, further comprising an external light source, wherein the lens emits light collected from the external light source and the display screen.

5. The display assembly of claim 4, wherein the external light source is a light-emitting diode.

6. The display assembly of claim 1, the lens further comprising anti-reflective coating.

7. The display assembly of claim 1, wherein at least one enhancement element of the plurality of enhancement elements separates at least a portion of the plurality of images displayed on the display screen.

8. The display assembly of claim 1, wherein at least one enhancement element of the plurality of enhancement elements is a magnifying lens.

9. The display assembly of claim 1, wherein at least one enhancement element of the plurality of enhancement elements is a portion of a Fresnel lens.

10. The display assembly of claim 1, wherein the lens further comprises:
- a light-collecting surface overlying the display screen, the light-collecting surface being configured to collect at least a portion of the light emitted by the display screen, the light-collecting surface being disposed opposite to the light-emitting surface; and
- a height, the height being defined between the light-emitting and light-collecting surfaces, the height varying in dimension.

11. The display assembly of claim 10, wherein the lens further comprises portions defining an opening within the lens, the opening extending through the height of the lens.

12. The display assembly of claim 11, the display screen being a touch screen.

13. The display assembly of claim 1, wherein the display screen is a reconfigurable display screen.

14. The display assembly of claim 13, wherein the display screen is configured to display a first set of images that physically corresponds to the first and second enhancement elements of the lens, and the display screen is further configured to display a second set of images that physically corresponds to the first and second enhancement elements of the lens.

15. The display assembly of claim 14, wherein an image of the first set of images is a gear indicator and an image of the second set of images is a warning indicator.

16. The display assembly of claim 1, wherein the display assembly is attached to the interior of a motor vehicle.

17. The display assembly of claim 1, wherein the display screen is one of a liquid crystal display (LCD) screen, a thin film transistor (TFT) LCD screen, a screen utilizing a digital light processing (DLP) projector, a liquid crystal on silicon (LCoS) screen, a plasma display panel (PDP), and a cathode ray tube.

18. The display assembly of claim 1, wherein at least one of the first and second enhancement elements is a ring.

19. The display assembly of claim 1, wherein the first enhancement element corresponds to a gear indicator shown on the display screen.

20. The display assembly of claim 19, wherein the second enhancement element corresponds to a speedometer shown on the display screen.

* * * * *